(12) United States Patent
Lu et al.

(10) Patent No.: US 11,574,454 B2
(45) Date of Patent: Feb. 7, 2023

(54) AUGMENTED REALITY SYSTEM SUPPORTING CUSTOMIZED MULTI-CHANNEL INTERACTION

(71) Applicant: Beihang University, Beijing (CN)

(72) Inventors: Feng Lu, Beijing (CN); Zhimin Wang, Beijing (CN)

(73) Assignee: Beihang University, Beijing (CN)

( * ) Notice: Subject to any disclaimer, the term of this patent is extended or adjusted under 35 U.S.C. 154(b) by 133 days.

(21) Appl. No.: 17/157,188

(22) Filed: Jan. 25, 2021

(65) Prior Publication Data
US 2021/0375061 A1   Dec. 2, 2021

(30) Foreign Application Priority Data

May 29, 2020   (CN) .......................... 202010476286.6

(51) Int. Cl.
*G06T 19/20* (2011.01)
*G06F 3/01* (2006.01)
*G06T 19/00* (2011.01)

(52) U.S. Cl.
CPC .............. *G06T 19/20* (2013.01); *G06F 3/011* (2013.01); *G06T 19/006* (2013.01); *G06T 2219/024* (2013.01); *G06T 2219/028* (2013.01)

(58) Field of Classification Search
CPC . G06T 19/20; G06T 19/006; G06T 2219/024; G06T 2219/028; G06T 19/003; G06F 3/011; G06F 3/017; G06F 2203/0381; G06F 3/013; G06F 3/012; G06V 20/20; G06V 40/28
See application file for complete search history.

(56) References Cited

U.S. PATENT DOCUMENTS

| | | | |
|---|---|---|---|
| 2010/0261527 A1* | 10/2010 | Steiner | A63F 13/42 463/36 |
| 2017/0367771 A1* | 12/2017 | Tako | G06T 19/003 |
| 2021/0110608 A1* | 4/2021 | Elby | G06T 19/006 |

* cited by examiner

*Primary Examiner* — Xilin Guo
(74) *Attorney, Agent, or Firm* — Dragon Sun Law Firm, PC; Jinggao Li; Nathaniel Perkins

(57) ABSTRACT

The embodiments of the present disclosure disclose an augmented reality system that supports customized multi-channel interaction. One embodiment of the augmented reality system comprises: a head-mounted sensor assembly, a computing device, and a display module; the head-mounted sensor assembly is used to capture the user's multi-channel interactive input information and transmit the interactive input information to the computing device; the computing device is used to generate or modify the display content of the augmented reality according to the interactive input information; the display module is used to overlay display the background content with the display content of the augmented reality. The augmented reality system, by arranging the display module to the far end of the head-mounted sensor assembly, can simplify the structure of the head-mounted sensor assembly, and reduce the weight of the head-mounted sensor assembly, providing convenience for installing other sensors.

14 Claims, 2 Drawing Sheets

AUGMENTED REALITY SYSTEM SUPPORTING CUSTOMIZED MULTI-CHANNEL INTERACTION

CROSS-REFERENCE TO RELATED APPLICATION

This application claims priority from the Chinese patent application 202010476286.6 filed May 29, 2020, the content of which is incorporated herein in the entirety by reference.

TECHNICAL FIELD

The embodiments of the present disclosure relate to the field of augmented reality, and in particular to an augmented reality system that supports customized multi-channel interaction.

BACKGROUND ART

AR (Augmented Reality) technology is a novel human-computer interaction technology that can add virtual information to the real world, thereby skillfully fusing virtual information with the real world, i.e., "augmenting" the real world.

Existing AR display technology devices mainly include an AR head-mounted device. The AR head-mounted device integrates the display unit into a head-mounted device, using a near-eye display technology. Although the above device achieves the integration of components, it increases the weight of the head-mounted device. Therefore, when the user experiences the device, it is often too heavy that dampens the user's experience.

In addition, the use of the near-eye display technology usually limits the viewing angle of the lens, which will also dampen the user's experience.

Accordingly, this field needs a new augmented reality system to solve the above problem.

Summary Contents

The content of the present disclosure is used to introduce concepts in a brief form, and these concepts will be described in detail in the following embodiments. The content portion of the present disclosure is not intended to identify the key features or essential features of the claimed technical solution, nor is it intended to limit the scope of the claimed technical solution.

To solve the above problem, some embodiments of the present disclosure propose an augmented reality system that supports customized multi-channel interaction, including: a head-mounted sensor assembly, a computing device, and a display module; the head-mounted sensor assembly is used to capture the user's multi-channel interactive input information and transmit the interactive input information to the computing device; the computing device is used to generate or modify the display content of the augmented reality according to the interactive input information; the display module is used to overlay display or superposition display the background content with the display content of the augmented reality, wherein the display module is set to the far end relative to the head-mounted sensor assembly.

In some embodiments, the system further comprises an augmented reality window displayed to the display module, the augmented reality window is used to display the display content of the augmented reality, and the position of the augmented reality window is determined through the posture of the user's head relative to the display module, thereby simulating the real effect of the display content of augmented reality; the shape and size of the augmented reality window are determined by setting the shape of a virtual window, wherein the virtual window is a near-eye window formed by back projection of the augmented reality window.

In some embodiments, the position where the augmented reality window is displayed onto the display module is determined through the following steps: establishing a coordinate system according to the display range of the display module; determining, based on the following formula, the point coordinates of the point on the boundary line where the virtual window is projected to the display module: $PA_i = \lambda_i PP_i$; wherein P represents the coordinates of the center point of the two eyes; $P_i$ represents the coordinates of the $i^{th}$ point on the edge of the virtual window; $A_i$ represents the point coordinates of the point where the straight line formed by starting from point P as the origin and passing through point $P_i$ intersects the display module; $PA_i$ represents the distance from point P to $A_i$; $PP_1$ represents the distance from point P to $P_i$; $\lambda_i$ represents the quotient of $PA_i$ and $PP_i$, and $\lambda_i$ is determined by the Z-axis coordinates of the three points P, $A_i$, and $P_i$.

In some embodiments, the computing device determines by the following formula the object in the display content that the eyeball focuses on: $\lambda_1 * \lambda_2 * \lambda_3 > 0$; wherein $\lambda_1$ is determined by the following formula:

$$\lambda_1 = \begin{cases} 1, & (x-x_r)^2 + (y-y_r)^2 + (z-z_r)^2 \leq r^2 \\ 0, & (x-x_r)^2 + (y-y_r)^2 + (z-z_r)^2 \geq r^2 \end{cases};$$

Wherein (x, y, z) are the coordinates of the object in the display content; $(x_r, y_r, z_r)$ are the three-dimensional focus point coordinates of the left and right eye sight direction; r represents the attention radius; wherein the spherical range formed by the attention radius represents the preset range of the focus point; in response to $\lambda_1=1$, it indicates that the object is in the preset range of the focus point; and in response to $\lambda_1=0$, it indicates that the object is out of the preset range of the focus point; wherein $\lambda_2$ is determined through the following formula:

$$\lambda_2 = \begin{cases} 1, & t \geq t_d \\ 0, & t < t_d \end{cases};$$

Wherein t represents the time that the focus point continuously selects the object within the preset time period, and $t_d$ is the preset threshold of the time; in response to $\lambda_2=1$, it indicates that the time the object has been focused on exceeds the preset threshold; in response to $\lambda_2=0$, it indicates that the time the object has been focused on is less than the preset threshold; wherein the specific formula of $\lambda_3$ is as follows:

$$\lambda_3 = \begin{cases} 1, & x_{min} \leq x \leq x_{max} \text{ and } y_{min} \leq y \leq y_{max} \\ 0, & x_{min} > x \text{ or } x > x_{max} \text{ or } y_{min} > y \text{ or } y > y_{max} \end{cases};$$

Wherein $(x_{min}, x_{max})$ represents the minimum and maximum values of the augmented reality display window in the x-axis direction, $(y_{min}, y_{max})$ represents the minimum and maximum values of the augmented reality display window in the y-axis direction; $\lambda_3=1$ means that the object is inside the augmented reality display window; $\lambda_3=0$ means that the object is outside the augmented reality display window.

In some embodiments, when the number of objects in the display content that the eyeballs have focused on is multiple, the computing device determines through the following steps the order in which the multiple objects are displayed: for the determined objects that the eyeballs have focused on, the probability of each object being displayed is determined through the following formula:

$$P_i = 1 - \min\left(1, \frac{d_i}{r}\right);$$

Wherein $P_i$ represents the probability of the $i^{th}$ object being displayed; $d_i$ represents the distance between the $i^{th}$ object and the gaze point; r represents the radius of the spherical area; based on the probability of each of the objects being displayed, determine the object to be displayed first.

In some embodiments, in response to the display module displaying multiple augmented reality windows, and the object of the display content being within the range of the multiple augmented reality windows or the object being selected by multiple interactive operations, the computing device displays one by one the objects modified by each of the interactive operations.

In some embodiments, the background content comprises acquired images or videos, and generated virtual dynamic or static scenes.

In some embodiments, the augmented reality display content comprises images or videos, generated virtual dynamic or static scenes or objects, as well as visualization effects of interactive operations. The augmented reality display content can be modified in real time by interactive operations, and only the part of it within the range of the augmented reality window is displayed.

In some embodiments, the head-mounted sensor assembly comprises at least one of the following: a camera, a microphone, a gesture sensor, and an eye movement tracking sensor, and the interactive operation characterized by the interactive input information comprises at least one of the following: a gesture interactive operation, a voice interactive operation and an eye movement interactive operation.

In some embodiments, the display mode of the display module comprises a two-dimensional plane display and a three-dimensional space display. When the display module performs the two-dimensional plane display, the display module comprises at least one of the following: a computer monitor, a tablet computer, and a screen projection; when the display module performs the three-dimensional space display, the display module comprises at least one of the following: a 3D projector and a 3D display.

One of the above embodiments of the present disclosure has the following beneficial effects: by arranging the display module to the far end of the head-mounted sensor assembly, the structure of the head-mounted sensor assembly can be simplified, and the weight of the head-mounted sensor assembly can be reduced, providing convenience for installing other sensors. Furthermore, by setting different sensors, the interaction between the system and the user is enriched, and the user experience is improved. In addition, compared with near-eye display, the display module can reduce the limitation of the lens viewing angle and improve the user's experience.

DESCRIPTION OF FIGURES

The above and other features, advantages and aspects of the embodiments of the present disclosure will become more apparent in conjunction with the drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION

Figure 1:
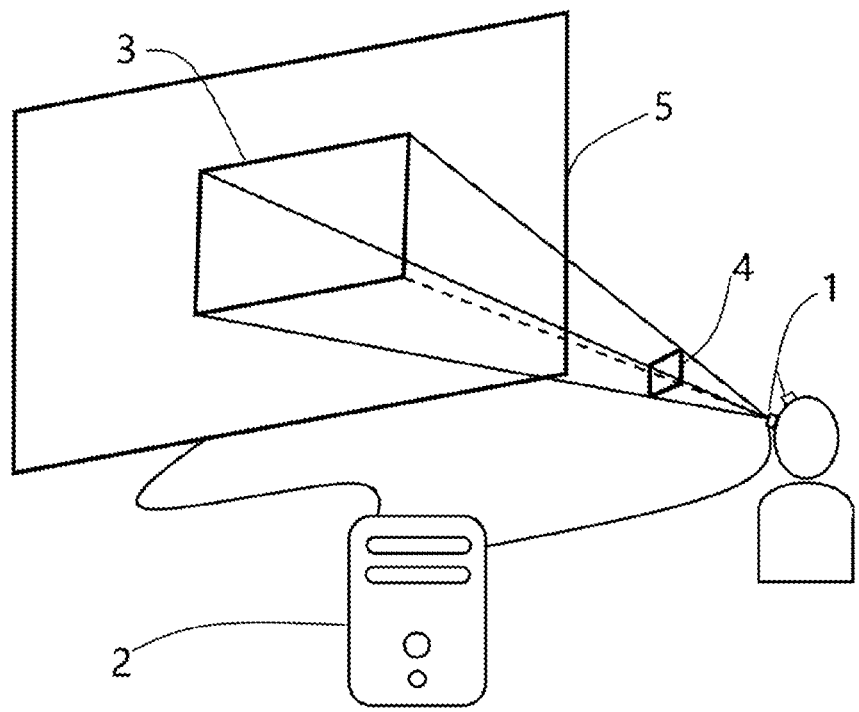
FIG. 1 is a schematic diagram of some structures of an augmented reality system supporting customized multi-channel interaction according to the present disclosure.

Embodiments of the present disclosure will be described hereinafter in more detail with reference to the accompanying drawings. Although certain embodiments of the present disclosure are shown in the drawings, it should be understood that the present disclosure can be implemented in various forms and shall not be construed as being limited to the embodiments set forth herein. On the contrary, these embodiments are provided for a more thorough and complete understanding of the present disclosure. It should be understood that the drawings and embodiments of the present disclosure are used only for exemplary purposes, not to limit the protection scope of the present disclosure.

In the description of the present disclosure, it should be noted that such terms as "installation", "connected with" and "connected to" should be understood in a broad sense, unless otherwise clearly specified and limited. For example, the connection can be fixed, or detachable, or integral; it can be a mechanical connection or an electrical connection; it can be directly connected or indirectly connected through an intermediate medium, and it can be an internal connection between two components. For a person having ordinary skill in the art, the specific meanings of the above-mentioned terms in the present disclosure shall be understood in specific situations.

In addition, it should be noted that, for ease of description, the drawings only show the parts related to the relevant disclosure. In the case of no conflict, the embodiments in the present disclosure and the features in the embodiments can be combined with each other. Hereinafter, the present disclosure will be described in detail with reference to the drawings and in conjunction with embodiments.

Besides, in the description of the present disclosure, the terms "up", "down", "left", "right", "in", "out" and other terms indicating directions or positional relationships are based on the directions or positional relationship shown in the drawings, for ease of description only, instead of indicating or implying that the device or element must have a specific orientation, be constructed and operated in a specific orientation, and therefore shall not be construed as a limitation to the present invention.

It should be noted that such concepts as "first" and "second" mentioned in the present disclosure are only used to distinguish different devices, modules or units, not to limit the order of functions performed by these devices, modules or units or the interdependence thereof.

It should be noted that such modifications as "one" and "more" mentioned in the present disclosure are illustrative and not restrictive. Those skilled in the art shall understand that, unless clearly stated otherwise in the context, they should be understood as "one or more".

The names of messages or information exchanged between multiple devices in the embodiments of the present disclosure are used only for illustrative purposes, not to limit the scope of these messages or information.

Hereinafter, the present disclosure will be described in detail with reference to the drawings and in conjunction with embodiments.

Firstly refer to FIG. 1. FIG. 1 is a schematic diagram of some structures of an augmented reality system supporting customized multi-channel interaction according to the present disclosure. As shown in FIG. 1, the head-mounted sensor assembly 1 is used to capture the user's multi-channel interactive input information, and transmit the collected interactive input information to the computing device 2. The computing device 2 generates or modifies the display content of augmented reality according to the aforementioned interactive input information, and transmits it to the display module 5. The display module 5 superimposes and displays the background content and the computed augmented reality display content. It should be noted that, different from displaying onto the head-mounted display device in the prior art, the above display module and head-mounted sensor are set to the far end at intervals. For example, the display module 5 may be a computer monitor, a plasma display screen, a liquid crystal display screen, and so on. Those skilled in the art can make a selection according to the actual situation. No limitation is made here.

To be specific, the aforementioned background content may be an image or video displayed in the display module 5. It can also be a virtual dynamic or static scene generated by conventional technical means. Taking the generation of a dynamic scene as an example, first, the elements of this dynamic scene may be determined, namely the target, background, and target movement and the like. Next, the path and angle of movement of the target and so on are determined. In the end, the required dynamic scene image is generated. Those skilled in the art can generate the aforementioned virtual dynamic scene or static scene according to the prior art or conventional technical means.

The above augmented reality display content may include images or videos, generated virtual dynamic or static scenes or objects, and visualization effects of interactive operations. The interactive operations may be human-computer interactive operations performed by the user with the system through the head-mounted sensor. Specifically, the interactive operations may include at least one of the following: gesture interactive operation, voice interactive operation, and eye movement interactive operation. In order to complete the above operations, relevant sensors can be provided on the head-mounted sensor assembly to collect information. The sensor assembly may include a camera, a microphone, a gesture sensor, and an eye movement tracking sensor. The user's interactive input information is acquired through the above-mentioned sensors.

Further, the corresponding visualization effects can be presented through the above interactive operations. For example, when a gesture sensor is used, through the acquired user's gesture interactive input information, the effect of the hand moving an object in the augmented reality display content can be simulated and etc.

In response to receiving the aforementioned interactive input information, the computing device implements the corresponding interactive operations. In other words, the augmented reality display content can be modified in real time by the computing device through interactive operations, and only the part of it within the augmented reality window is displayed. In this way, the function of the computing device generating or modifying the content of the augmented reality is realized. Those skilled in the art can choose among existing related sensors to implement the above interactive operations by conventional technical measures.

Figure 2:
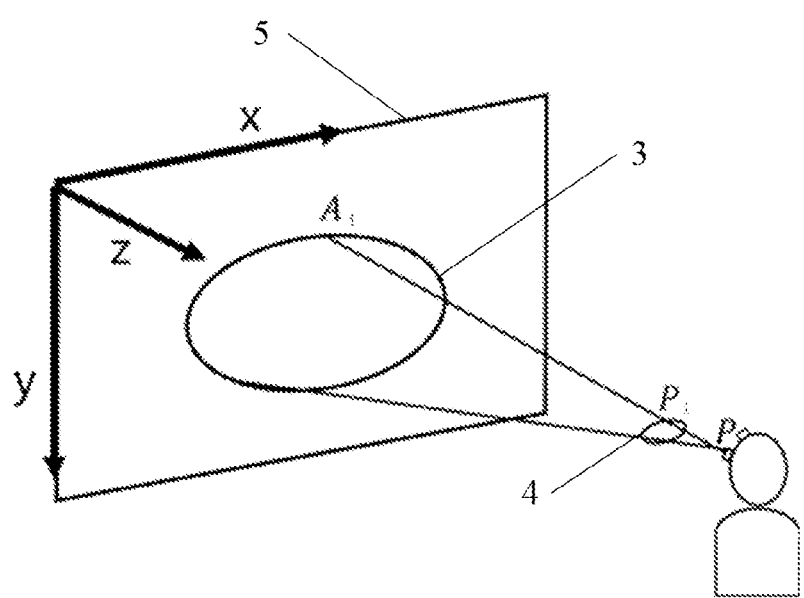
FIG. 2 is a schematic diagram of some further structures of an augmented reality system supporting customized multi-channel interaction according to the present disclosure.

Next, the system will be described with reference to FIG. 1 and FIG. 2. FIG. 2 is a schematic diagram of some further structures of an augmented reality system supporting customized multi-channel interaction according to the present disclosure. As shown in FIG. 1 and FIG. 2, the augmented reality system further comprises an augmented reality window 3 displayed to the display module 5. The augmented reality window 3 is used to display the display content of the augmented reality. To be specific, the shape and size of the augmented reality window 3 can be set by users themselves or the system defaults. To be specific, the user inputs the shape and size of the augmented reality window 3 through a human-computer interactive operation interface. The shape can be round, rectangular, etc. The size may be the side length of the above shape, the center of a circle, and so on.

Further, the augmented reality window 3 may be back-projected to the near-eye end of the user to form a virtual window 4. The shape of the virtual window 4 is the same as the shape of the augmented reality window 3. The distance between the virtual window 4 and the user affects the size of the augmented reality window 3. That is, when the virtual window 4 is close to the user, the size of the augmented reality window 3 presented to the display module 5 becomes larger. Therefore, without the user moving, the size of the augmented reality window 3 can be adjusted by adjusting the distance between the virtual window 4 and the user.

The position where the augmented reality window 3 is displayed to the display module 5 is determined through the following steps:

The first step is to establish a coordinate system according to the display range of the display module 5.

In some embodiments, a point can be selected in the display range of the display module 5 as the origin of coordinates. Further, a three-axis coordinate system is established on the basis of the origin. As an example, the upper left corner of the display range of the display module 5 may be determined as the origin of coordinates, and the length direction may be the X-axis, the height direction is taken as the Y axis, the vertical direction between the user and the display module 5 is the Z axis, thereby forming a three-axis coordinate system.

The second step is to determine according to the following formula the point coordinates of the point on the boundary line where the virtual window 4 is projected to the display module 5:

$$PA_i = \lambda_i PP_i;$$

Wherein P represents the coordinates of the center point of the two eyes, wherein the coordinates of the point P can be determined through related algorithms. For example, the PNP (Perspective-n-Point) algorithm or the EPNP (Efficient Perspective-n-Point) algorithm can obtain the center point coordinates of the two eyes through key point detection, coordinate system conversion, and so on.

$P_i$ represents the coordinates of the $i^{th}$ point on the edge of the virtual window 4, wherein the size of the augmented reality window 3 can be adjusted by adjusting the distance between the virtual window 4 and the user without the user moving. When determining the size of the augmented reality window, the distance from the virtual window 4 to the user is known. In turn, the coordinates of the $i^{th}$ point on the edge of the virtual window 4 can be determined through the size, shape, and P point coordinates of the virtual window 4.

$A_i$ represents the point coordinates of the point where the straight line formed by starting from point P as the origin and passing through point $P_i$ intersects the display module 5;

$PA_i$ represents the distance from point P to $A_i$;

$PP_i$ represents the distance from point P to $P_i$, wherein the value of $PP_i$ can be determined through the coordinates of point P and the coordinates of point $P_i$;

$\lambda_i$ represents the quotient of $PA_i$ and $PP_i$, and $\lambda_i$ is determined by the Z-axis coordinates of the three points P, $A_i$, and $P_i$. To be specific, the distance from the virtual window 4 to the user is known, and the distance from the display module to the user can be determined through the coordinates of point P.

The value of $PA_i$ can be calculated by the above formula. Since the point $A_i$ is presented on the display module 5, the coordinates of point $A_i$ can be determined according to the value of $PA_i$.

In the end, the point coordinates of multiple points on the above-mentioned boundary can determine the display range of the augmented reality window and the display position on the display module.

Further, the computing device may determine the object in the display content that the user's eyeballs are focusing on by using the following formula:

$$\lambda_1 * \lambda_2 * \lambda_3 > 0;$$

Wherein $\lambda_1$ is determined by the following formula:

$$\lambda_1 = \begin{cases} 1, & (x-x_r)^2 + (y-y_r)^2 + (z-z_r)^2 \leq r^2 \\ 0, & (x-x_r)^2 + (y-y_r)^2 + (z-z_r)^2 \geq r^2 \end{cases};$$

Wherein (x, y, z) are the coordinates of the object in the display content, wherein the coordinates of the display content object can be determined in a variety of ways, for example, the coordinates can be determined by a target detection algorithm or a related spatial coordinate algorithm. In addition, the technician can also preset the coordinates of the object in advance.

$(x_r, y_r, z_r)$ are the three-dimensional focus point coordinates of the left and right eye sight direction, where the three-dimensional focus point coordinates can be determined by the existing tracking sensors.

r represents the attention radius; wherein the spherical range formed by the attention radius represents the preset range of the focus point, wherein the above attention radius may be determined by a technician through a lot of experiments. It can also be set by the computing device by default.

In response to $\lambda_1=1$, it indicates that the object is in the preset range of the focus point.

In response to $\lambda_1=0$, it indicates that the object is out of the preset range of the focus point.

Wherein $\lambda_2$ is determined through the following formula:

$$\lambda_2 = \begin{cases} 1, & t \geq t_d \\ 0, & t < t_d \end{cases};$$

Wherein t represents the time that the focus point continuously selects the object within the preset time period, which may be that the focus point overlaps the display range of the object, $t_d$ is the preset threshold of the time, wherein the preset time and the preset threshold can be determined by a technician through a large number of experiments, or set by the computing device by default.

In response to $\lambda_2=1$, it indicates that the time the object has been focused on exceeds a preset threshold;

In response to $\lambda_2=0$, it indicates that the time the object has been focused on is less than a preset threshold;

Wherein the specific formula of $\lambda_3$ is as follows:

$$\lambda_3 = \begin{cases} 1, & x_{min} \leq x \leq x_{max} \text{ and } y_{min} \leq y \leq y_{max} \\ 0, & x_{min} > x \text{ or } x > x_{max} \text{ or } y_{min} > y \text{ or } y > y_{max} \end{cases};$$

Wherein $(x_{min}, x_{max})$ represents the minimum and maximum values of the augmented reality display window in the x-axis direction, $(y_{min}, y_{max})$ represents the minimum and maximum values of the augmented reality display window in the y-axis direction;

$\lambda_3=1$ means that the object is inside the augmented reality display window;

$\lambda_3=0$ means that the object is outside the augmented reality display window.

Furthermore, in response to when the number of objects in the display content that the eyeballs have focused on is multiple, the computing device determines through the following steps the order in which the multiple objects are displayed:

For the determined objects that the eyeballs have focused on, the probability of each object being displayed is determined by the following formula:

$$P_i = 1 - \min\left(1, \frac{d_i}{r}\right);$$

Wherein $P_i$ represents the probability of the $i^{th}$ object being displayed;

$d_i$ represents the distance between the $i^{th}$ object and the gaze point; and The object to be displayed first is determined according to the probability of each of the objects being displayed.

Figure 3:
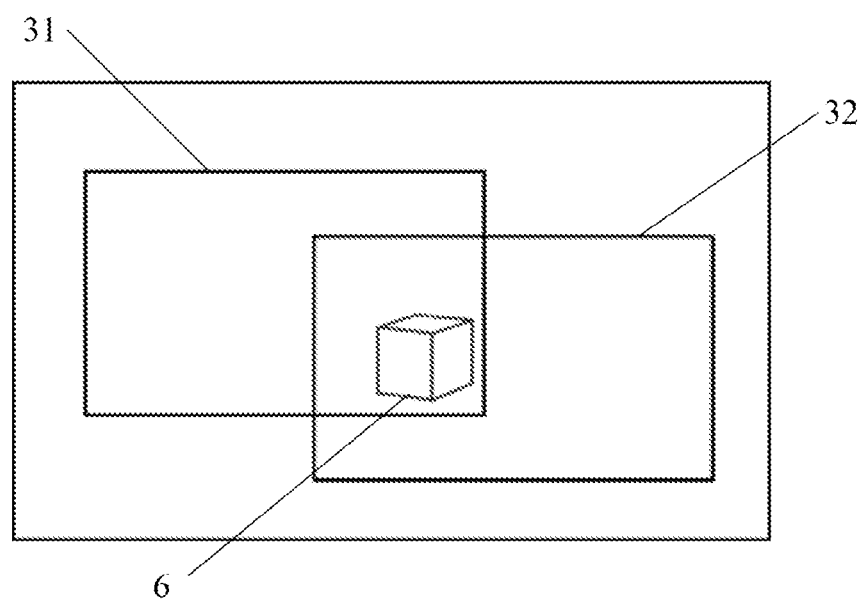
FIG. 3 is an application scenario diagram of an augmented reality system supporting customized multi-channel interaction used by more than one person according to the present disclosure.

In some modes of implementation of certain optional embodiments, responsive to the display module displaying a plurality of augmented reality windows, and the object of the display content being in the range of the plurality of augmented reality windows or the object being selected by a plurality of the interactive operations, the computing device displays one by one the objects modified by each of the interactive operations, and displays them in each of the aforementioned augmented reality windows. Next, description will be made in combination with FIG. 3. FIG. 3 is an application scenario diagram of an augmented reality system supporting customized multi-channel interaction used by more than one person according to the present disclosure. When the display module shows two augmented reality windows (31 and 32 in the figure). When the display content of each of the above augmented reality windows comprises the same object 6, and when the object 6 is selected or modified by the user's interactive operation, the scenes when the above interactive operations change the object 6 can be displayed in sequence according to the set factors. The above-mentioned set factors may be the time when the user's interactive operations occur, or may be a sequence set for different users in advance.

In the augmented reality system disclosed in some embodiments of the present disclosure, the virtual window formed by back-projection of the augmented reality window can adjust the size of the augmented reality window by adjusting the distance between the virtual window and the user. In this way, the user can customize the size of the augmented reality window to improve the user's experience.

In addition, as the user's perspective changes, the position of the augmented reality window displayed at the display module may change. By constructing a three-axis coordinate system on the display module, and at the same time, based on the coordinates of the virtual window and the user, the position of the point of the augmented reality window edge on the display module can be accurately determined, thereby determining the position of the augmented reality window in the display module. Therefore, a reasonable position of the augmented reality window on the display module is displayed according to the change of the user's perspective, which can more vividly and appropriately display the content of augmented reality, thus improving the user's experience.

Besides, the object in the display content that the user's eyes have focused on is determined by determining the preset range of the user's focus point, the time of the object being focused on, and whether the object is within the range of the augmented reality display window. In this way, the object which the user has focused on can be accurately determined, and thereby displayed precisely, thus improving the accuracy of the system as well as the user's experience.

The above description is only a preferred embodiment of the present disclosure and an explanation of the applied technical principles. Those skilled in the art shall understand that the scope of the invention involved in the present disclosure is not limited to the technical solutions formed by the specific combination of the above technical features, but should also cover other technical solutions formed by any combination of the above technical features or their equivalents without departing from the inventive concept, for example, technical solutions formed by mutually replacing the above features with the technical features disclosed in the present disclosure (but not limited to) with similar functions.

The invention claimed is:

1. An augmented reality system supporting customized multi-channel interaction, wherein the augmented reality system comprises a head-mounted sensor assembly, a computing device, and a display module;
   the head-mounted sensor assembly is used to capture a multi-channel interactive input information of a user and transmit the interactive input information to the computing device;
   the computing device is used to generate or modify a display content of an augmented reality according to the interactive input information; and
   the display module is used to overlay display a background content with the display content of the augmented reality, wherein the display module is set to a far end relative to the head-mounted sensor assembly;
   wherein the system further comprises an augmented reality window displayed to the display module, the augmented reality window being used to display the display content of the augmented reality, and a position where the augmented reality window is displayed onto the display module is determined through the following steps:
   establishing a coordinate system according to a display range of the display module;
   determining, based on the following formula, point coordinates of a point on a boundary line where a virtual window is projected to the display module:

$$PA_i = \lambda_i PP_i;$$

wherein P represents coordinates of a center point of two eyes;
   $P_i$ represents coordinates of an $i^{th}$ point on an edge of the virtual window;
   $A_i$ represents point coordinates of a point where a straight line formed by starting from point P as an origin and passing through point $P_i$ intersects the display module;
   $PA_i$ represents a distance from point P to $A_i$;
   $PP_i$ represents a distance from point P to $P_i$;
   $\lambda_i$ represents a quotient of $PA_i$ and $PP_i$, and $\lambda_i$ is determined by Z-axis coordinates of three points P, $A_i$, and $P_i$.

2. The augmented reality system according to claim 1, wherein the position of the augmented reality window is determined through a posture of a head of the user relative to the display module, thereby simulating a real effect of the display content of the augmented reality; a shape and size of the augmented reality window are determined by setting a shape of the virtual window, wherein the virtual window is a near-eye window formed by back projection of the augmented reality window.

3. The augmented reality system according to claim 1, wherein the computing device determines by the following formula an object in the display content that an eyeball focuses on:

$$\lambda_1 * \lambda_2 * \lambda_3 > 0;$$

wherein $\lambda_1$ is determined by the following formula:

$$\lambda_1 = \begin{cases} 1, & (x-x_r)^2 + (y-y_r)^2 + (z-z_r)^2 \leq r^2 \\ 0, & (x-x_r)^2 + (y-y_r)^2 + (z-z_r)^2 \geq r^2 \end{cases};$$

wherein (x, y, z) are coordinates of the object in the display content;
$(x_r, y_r, z_r)$ are three-dimensional focus point coordinates of a left and right eye sight direction;
r represents an attention radius; wherein a spherical range formed by the attention radius represents a preset range of the focus point;
in response to $\lambda_1=1$, it indicates that the object is in the preset range of the focus point;
in response to $\lambda_1=0$, it indicates that the object is out of the preset range of the focus point;
wherein $\lambda_2$ is determined through the following formula:

$$\lambda_2 = \begin{cases} 1, & t \geq t_d \\ 0, & t < t_d \end{cases};$$

wherein t represents a time that the focus point continuously selects the object within a preset time period, and $t_d$ is a preset threshold of the time;
in response to $\lambda_2=1$, it indicates that the time the object has been focused on exceeds the preset threshold;
in response to $\lambda_2=0$, it indicates that the time the object has been focused on is less than the preset threshold;
wherein specific formula of $\lambda_3$ is as follows:

$$\lambda_3 = \begin{cases} 1, & x_{min} \le x \le x_{max} \text{ and } y_{min} \le y \le y_{max} \\ 0, & x_{min} > x \text{ or } x > x_{max} \text{ or } y_{min} > y \text{ or } y > y_{max} \end{cases};$$

wherein ($x_{min}$, $x_{max}$) represents minimum and maximum values of the augmented reality display window in an x-axis direction, ($y_{min}$, $y_{max}$) represents minimum and maximum values of the augmented reality display window in a y-axis direction;

$\lambda_3=1$ means that the object is inside the augmented reality display window; and $\lambda_3=0$ means that the object is outside the augmented reality display window.

4. The augmented reality system according to claim 3, wherein when a number of the objects in the display content that the eyeballs have focused on is multiple, the computing device determines through the following steps an order in which the multiple objects are displayed:

for the determined objects that the eyeballs have focused on, a probability of each object being displayed is determined through the following formula:

$$P_i = 1 - \min\left(1, \frac{d_i}{r}\right);$$

wherein $P_1$ represents the probability of an $i^{th}$ object being displayed;

$d_i$ represents a distance between the $i^{th}$ object and a gaze point;

r represents a radius of a spherical area; and based on the probability of each of the objects being displayed, determine the object to be displayed first.

5. The augmented reality system according to claim 1, wherein in response to the display module displaying multiple augmented reality windows, and the objects of the display content being within a range of the multiple augmented reality windows or the objects being selected by multiple interactive operations, the computing device displays one by one the objects modified by each of the interactive operations.

6. The augmented reality system according to claim 5, wherein the background content comprises acquired images or videos, and generated virtual dynamic or static scenes.

7. The augmented reality system according to claim 5, wherein the augmented reality display content comprises images or videos, generated virtual dynamic or static scenes or objects, as well as visualization effects of interactive operations, the augmented reality display content can be modified in real time by interactive operations, and only a part of it within the range of the augmented reality window is displayed.

8. The augmented reality system according to claim 1, wherein the head-mounted sensor assembly comprises at least one of the following: a camera, a microphone, a gesture sensor, and an eye movement tracking sensor, and the interactive operation characterized by the interactive input information comprises at least one of the following: a gesture interactive operation, a voice interactive operation and an eye movement interactive operation.

9. The augmented reality system according to claim 1, wherein a display mode of the display module comprises a two-dimensional plane display and a three-dimensional space display, and when the display module performs the two-dimensional plane display, the display module comprises at least one of the following: a computer monitor, a tablet computer, and a screen projection; when the display module performs the three-dimensional space display, the display module comprises at least one of the following: a 3D projector and a 3D display.

10. The augmented reality system according to claim 2, wherein in response to the display module displaying multiple augmented reality windows, and the objects of the display content being within a range of the multiple augmented reality windows or the objects being selected by multiple interactive operations, the computing device displays one by one the objects modified by each of the interactive operations.

11. The augmented reality system according to claim 1, wherein in response to the display module displaying multiple augmented reality windows, and the objects of the display content being within a range of the multiple augmented reality windows or the objects being selected by multiple interactive operations, the computing device displays one by one the objects modified by each of the interactive operations.

12. The augmented reality system according to claim 1, wherein in response to the display module displaying multiple augmented reality windows, and the objects of the display content being within a range of the multiple augmented reality windows or the objects being selected by multiple interactive operations, the computing device displays one by one the objects modified by each of the interactive operations.

13. The augmented reality system according to claim 3, wherein in response to the display module displaying multiple augmented reality windows, and the objects of the display content being within a range of the multiple augmented reality windows or the objects being selected by multiple interactive operations, the computing device displays one by one the objects modified by each of the interactive operations.

14. The augmented reality system according to claim 4, wherein in response to the display module displaying multiple augmented reality windows, and the objects of the display content being within a range of the multiple augmented reality windows or the objects being selected by multiple interactive operations, the computing device displays one by one the objects modified by each of the interactive operations.

* * * * *